United States Patent

[11] 3,607,482

[72] Inventor Robert P. Selm
Salina, Kans.
[21] Appl. No. 849,052
[22] Filed Aug. 11, 1969
[45] Patented Sept. 21, 1971
[73] Assignee Wilson & Company
Salina, Kans.

[54] PROCESS OF REGENERATION OF METAL TREATING SOLUTIONS
8 Claims, 1 Drawing Fig.

[52] U.S. Cl................................................. 156/19,
134/13, 134/41, 134/109, 156/22, 156/345
[51] Int. Cl....................................................... C23f 1/00,
C23g 1/14
[50] Field of Search............................................ 156/19, 22,
345; 134/13, 41, 109

[56] References Cited
UNITED STATES PATENTS
2,828,193 3/1958 Newman .................. 156/19 UX
2,975,041 3/1961 Holman ..................... 156/19
3,486,954 12/1969 Ashcraft...................... 156/19

OTHER REFERENCES
Pickling Acid Regeneration by Poliskin, Metal Finishing, Nov. 1965, Pages 72, 73 and 76 relied upon.

*Primary Examiner*—William A. Powell
*Attorney*—Fishburn, Gold and Litman

ABSTRACT: A process for regeneration of spent and partially spent metal treating solutions, such as used for treating aluminum. The process includes collecting a portion of the metal-treating solution with the collected solution containing metal salts dissolved from the metal being treated in a treating space, recirculating a portion of the collected solution, and flowing the remainder into a clarifying stage where a precipitating agent is introduced and mixed therewith and solids formed at said stage settled out providing a clarified supernatant solution which is returned to the treating space. The metal salts removed are in the class of carbonates, sulfates, chromates and aluminates and the precipitating agent is an alkaline earth hydroxide, such as calcium hydroxide, barium hydroxide and strontium hydroxide.

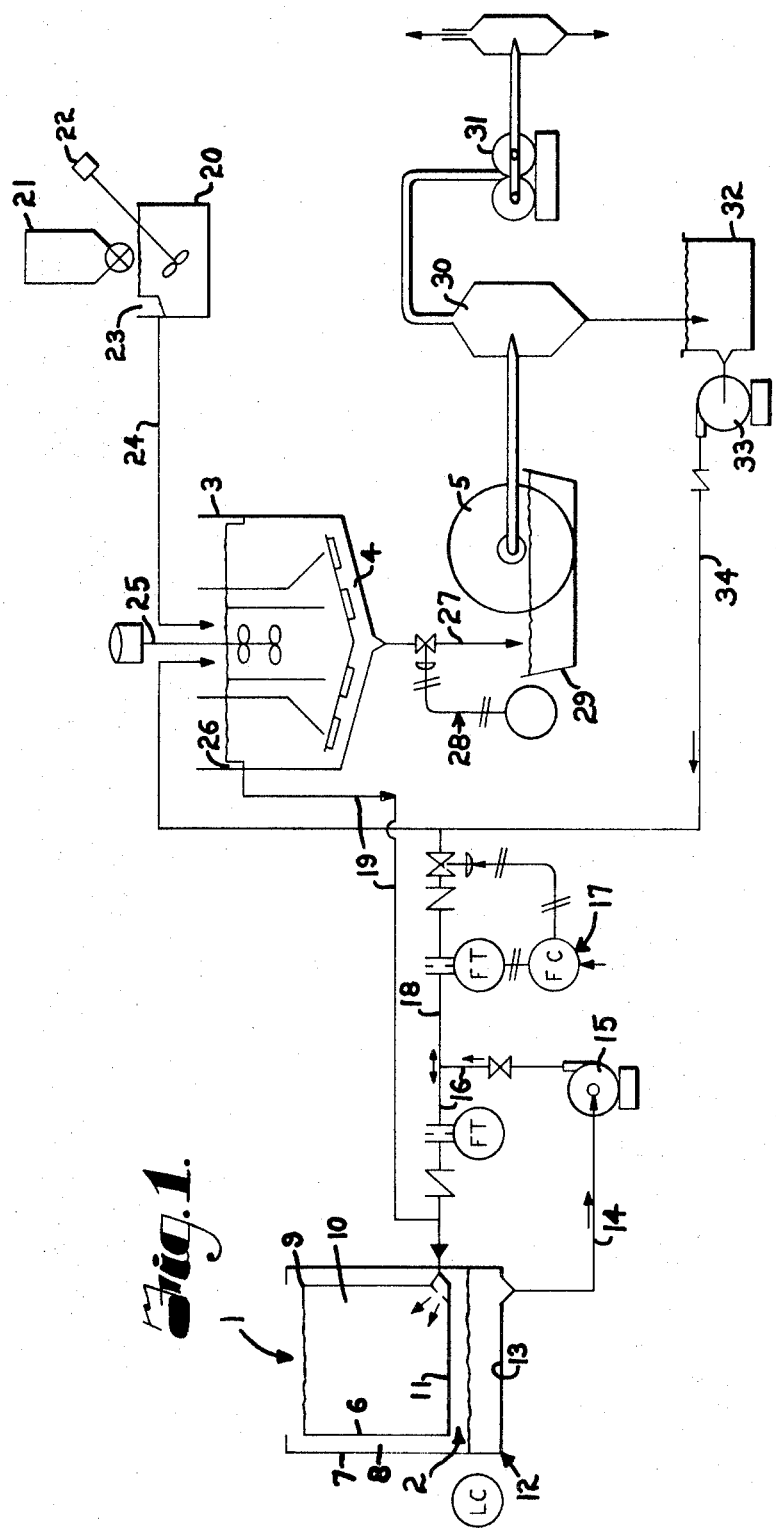

PROCESS OF REGENERATION OF METAL TREATING SOLUTIONS

The present invention relates to the regeneration of solutions used for the chemical etching, sizing, milling, finishing and cleaning of metals, and more particularly to regeneration of such metal treating solutions by chemically precipitating dissolved metal salts and chemically replacing treating agents.

Heretofore it was necessary to discard spent alkaline solutions of caustic soda, or more particularly sodium hydroxide, used for treating metals, such as aluminum and its alloys, for purposes such as sizing, milling, finishing, cleaning, etching and the like, which solutions become contaminated with dissolved metal salts, such as aluminum from the reaction:

$$2NaOH + 2H_2O + 2Al \rightarrow 2NaAlO_2 + 3H_2 \quad (1)$$

In the etching or milling of aluminum with a solution of caustic soda, the dissolved metal remains in solution as the salt, sodium aluminate, and as its concentration increases, the activity of the solution and its useful properties decreases, eventually becoming completely ineffective. Heretofore, the entire treating solution was discarded and replaced with a new solution. Also, as the solution became more concentrated with respect to aluminum, it was increasingly subject to scaling due to the deposition of alumina. The solution also became more concentrated with respect to the soluble impurities contained in the makeup water and from the compounds added for solution control of scaling, leveling and as smoothing agents. Sulfides were commonly added to these baths or solutions and these sulfides were air oxidized to sulfates. The treating solution gradually assumes a high concentration of ions of aluminum, sulfate and sodium. The quantity of hydroxyl ions diminished and ultimately disappeared altogether when the solution became entirely spent. The hydroxyl ion is the basic source of activity of chemical etching process as evidenced by the ionic equation:

$$2OH^- + 2Al \rightarrow AlO_2^- + H_2 \quad (2)$$

Chemical milling and etch solutions deteriorate directly by loss of hydroxyl ion concentration and indirectly by a buildup of other anions principally aluminate and sulfate and also to a lesser degree chloride, carbonate, nitrate, and other miscellaneous anions. The deteriorated or spent treating solution constitutes a costly and complex waste material to prepare for ultimate disposal.

Treating solutions generally contain many other compounds besides the caustic soda wherein the principal additives are sodium sulfides, organic compounds, other salts, sequestrants, scale inhibitors, brighteners, leveling agents, and many others. The principal active compound or treating agent present in chemical milling or etching solutions is caustic soda or more particularly sodium hydroxide. The cost of effective pollution control is high particularly when the entire solution must be discarded due to an excessive aluminum content and replaced with an entirely new solution.

The present invention dealuminizes the treating solution, regenerates the caustic soda and preserves the additives within the solution, and substantially increases the useful life of the treating solution. The useful life of the treating solution is now determined only by the gradual buildup of soluble metal salts not removed in the present regeneration process.

The principal objects of the present invention are: to provide a process for regeneration of spent and partially spent metal treating solutions, particularly alkaline caustic solutions used to etch aluminum and its alloys for purposes such as sizing, milling, finishing, cleaning and etching; to provide such a process for regeneration of metal treating solutions which substantially reduces chemical cost and preserves costly additives present in the solution to be regenerated; to provide such a process for regeneration of metal-treating solutions which eliminates the disposal of dangerously toxic and difficult to treat waste products; to provide such a process for regeneration of metal treating solutions wherein the solution in a treating receptacle for chemical milling, etching, sizing or the like, will be maintained at a relatively constant composition, thereby providing a more consistent treatment rate and an improved quality of work; to provide such a process for regeneration of metal-treating solutions which is substantially automatic and requires only part time labor for operation; to provide such a process for regeneration of metal-treating solutions wherein the regeneration is controlled by the density of the solution, thereby maintaining a substantially constant quality with a minimum of testing or analysis; to provide such a process for regeneration of metal-treating solutions which operates most effectively at work temperatures rather than at cooler temperatures, thereby eliminating the need for cooling and reheating; to provide such a process for regeneration of metal-treating solutions wherein the production of scale in the form of alumina is substantially eliminated by operating the regeneration process within the soluble region of the phase equilibria of the system having alumina in solution; to provide such a process for regeneration of metal-treating solutions employing in sequence a calcium hydroxide as the precipitating agent for the removal of carbonate and aluminate and gross amounts of sulfate followed by barium hydroxide as the precipitating agent to remove additional sulfates and chromates thereby taking advantage of the lower cost of hydrated lime to remove the aluminate which constitutes the bulk of the contamination in aluminum etching and the more expensive barium hydroxide selectively to remove other contaminates as required; to provide such a process for regeneration of metal-treating solutions wherein the metal-treating operations are substantially undisturbed and the chemical composition of the treating solution remains substantially constant; and to provide such a process for regeneration of metal-treating solutions which is simple to control, is substantially uniform in results, is economical to operate, and is particularly well adapted for the proposed use.

Other objects and advantages of this invention will become apparent from the following description taken in connection with the accompanying drawing wherein are set forth by way of illustration and example certain embodiments of this invention.

FIG. 1 is a flow diagram for the process embodying features of the present invention.

The present process of regeneration of metal treating solutions includes treating a portion of a metal treating solution with an alkaline earth hydroxide, such as hydrated lime, in a rapid mix tank thereby settling out solids formed therein as well as those already present, and adding the resulting supernatant back to the original treating receptacle for reuse. The process for regenerating the treating solution can also be carried out with either barium hydroxide or strontium hydroxide to effect removal of sulfates and chromates as well as the aluminates. The following equations (3) through (7) inclusive illustrate the reaction upon the metal salts, such as sodium aluminate, chromate, carbonate, and sulfate using hydrated lime or more particularly calcium hydroxide, $Ca(OH)_2$, to form an insoluble calcium salt and regenerate the original caustic soda for reuse:

$$2NaAlO_2 + Ca(OH)_2 \rightarrow CaO \cdot Al_2O_3 + 2NaOH \quad (3)$$
$$2NaAlO_2 + 3Ca(OH)_2 \rightarrow 3CaO \cdot Al_2O_3 + 2NaOH + 4H_2O \quad (4)$$
$$Na_2SO_4 + Ca(OH)_2 \rightarrow CaSO_4 + 2NaOH \quad (5)$$
$$Na_2CO_3 + Ca(OH)_2 \rightarrow CaCO_3 + 2NaOH \quad (6)$$
$$Na_2CrO_4 + Ca(OH)_2 \rightarrow CaCrO_4 + 2NaOH \quad (7)$$

The following equations (8) to (12) inclusive illustrate the use of barium hydroxide for forming an insoluble barium salt and regenerating the caustic soda originally used in preparation of a bath or treating solution for chemical milling or chemical sizing.

$$2O_2 + Ba(OH)_2 \rightarrow BaO \cdot Al_2O_3 + 2NaOH \quad (8)$$
$$2NaAlO_2 + 2Ba(OH)_2 \rightarrow 2BaO \cdot Al_2O_3 + 2NaOH + H_2O \quad (9)$$
$$Na_2SO_4 + Ba(OH)_2 \rightarrow BaSO_4 + 2NaOH \quad (10)$$
$$Na_2CO_3 + Ba(OH)_2 \rightarrow BaCO_3 + 2NaOH \quad (11)$$
$$NaCrO_4 + Ba(OH)_2 \rightarrow BaCrO_4 + 2NaOH \quad (12)$$

The use of strontium hydroxide produces similar equations for forming an insoluble strontium salt and regenerating the caustic soda.

The alkaline earth hydroxides, such as calcium, barium and strontium hydroxides are added in stoichiometric quantities for the desired removal of aluminate, chromate, and sulfate in accordance with equations (3) through (12) inclusive. Sulfate concentrations in metal treating solutions are built-up excessively by oxidation of sulfides commonly present therein which are commonly agitated while hot with air. Hydrated lime, while less effective than barium hydroxide or strontium hydroxide, will remove gross amounts of sulfates at high concentration.

Chromates are present in metal treating solutions either by design, as additives, or inadvertently by spills or dragout from adjacent desmut tanks and the like. Barium hydroxide is most effective in removal of these chromates, if such removal is desired.

The process of regeneration involves either treatment in situ, or preferably treatment at another location while the metal-treating operations continue and the treating solution is provided a partial regeneration and reinjected into a work or treating receptacle so that production is undisturbed and uninterrupted and the solution composition remains substantially constant in quality and density.

As an example of a regeneration system, the metal treating is in a work receptacle 1 and a portion of the treating solution overflows from the work receptacle 1 into a surge space 2, such as a drum, or tank, below the work or treating receptacle 1. The excess solution or collected portion is pumped or moved into a rapid mix receptacle 3 where it is reacted with an alkaline earth hydroxide, such as calcium hydroxide or barium hydroxide or strontium hydroxide. The solution is then processed by a clarifier structure 4 and the clarified supernatant liquor resulting from precipitating insoluble solids from the solution is returned to the work or treating receptacle 1 and the thickened sludge precipitated from the solution and some solution is carried to a rotary vacuum filter 5 where the precipitate is removed as a dry or semidry cake consisting of alkaline earth aluminate, the sulfides of alloying elements in the aluminum, some sulfates and chromates and some alkaline earth carbonates. The filtrate is returned to the treating receptacle.

It is preferred that the regeneration process be operated at substantially the same level of removal of the dissolved metal salts from the treating solution, particularly sodium aluminate, as the level of production of the dissolved metal salts, in the treating receptacle 1, and thereby added to the solution so that the concentration of the dissolved metal salts, such as sodium aluminate, in the treating solution remains at a selected substantially constant level.

The preferred method of treatment for the regeneration of a metal-treating solution is to construct the work tank or receptacle 1 with both an inner and outer shell 6 and 7 respectively, thereby providing a space 8 therebetween which serves as an overflow or surge space. The regenerated solution is pumped into the bottom of the inner shell 6 and flows upwardly to contact the metal to be processed, particularly an aluminum alloy. The treating solution overflows the inner shell 6 along predetermined lengths of a top rim 9 and falls down into the annular surge space 2 therebelow, from which it is pumped out to the regeneration treatment. Solution returned to the work tank or receptacle 1 from the regeneration treatment has been dealuminized adjusted to proper temperature, adjusted for evaporation losses, reconstituted with hydroxyl ion and clarified. The regeneration process is particularly adapted to be operated continuously and to provide a constant solution composition and relatively constant etch rate for the alloy being etched.

Inputs for the regeneration process will be steam, air, solids-free makeup water, and an alkaline earth hydroxide, principally calcium hydroxide. Outputs from the process will be a nontoxic, relatively insoluble, biologically inert sludge which can be suitably disposed of, as for land fill, without further treatment.

It is desirable to provide a means for recirculation of the solution from the surge space 2 into the work or treating receptacle 1, thereby minimizing stratification which causes uneven etching. Control of the treating solution can be maintained by using continuous density measurements since the density rises or increases directly with the aluminate content and removal of the aluminate by the alkaline earth hydroxide produces a resulting drop in the density of the solution.

Regeneration of the metal-treating solution may involve a step procedure to obtain the most effective removal of contaminates wherein as a first step calcium hydroxide is added to precipitate the carbonate and aluminate and gross amounts of sulfates followed by a second step using barium hydroxide to remove additional sulfate and chromate thereby taking advantage of the lower cost of hydrated lime to remove the aluminate which constitutes the bulk of the contamination in the treating solution. The barium hydroxide is used selectively to remove other contaminates as required. Nitrates and chlorides in solution are not affected by addition of calcium hydroxide or barium hydroxide, therefore, nitrates and chlorides may be added to the treating solution to control other aspects of the metal-treating operation.

The presence of other additives such as gluconates, sorbitol, sucrose, or the like in the metal treating solution does not materially affect the precipitation of these contaminates, but these additives present an additional incentive for regeneration as an alternate to disposal. Heavy metals such as tin, chromium, copper, cobalt, borates, zinc, cadmium and the like may be added to the metal-treating solution for various purposes, however, these additives are particularly costly, toxic to animal and plant life, and particularly difficult to remove in an industrial waste process thereby presenting a further reason for regeneration as an alternate to disposal.

The present process involves regeneration by metathesis and when aluminum is dissolved in a caustic soda solution the product, sodium aluminate, formed therein remains in the solution and becomes a part of the system, $Na_2O-Al_2O_3-H_2O$, which is subject to definite and distinct phase equilibria which have become well determined and known in the art. These equilibria show clearly those areas of molar ratio $Na_2O-Al_2O_3$ wherein precipitation of solids must occur at several temperatures. Sequestering or chelating agents have been used to inhibit the precipitation of alumina. Hydrolysis of the product sodium aluminate cannot take place unless by dilution, by a temperature change, or by a change in the composition of the solution occurring in a magnitude that crosses a phase boundary to permit disposition of sodium aluminate or alumina.

Operation of the regeneration process for metal-treating solutions is preferably conducted within a soluble region of the phase diagram thereby assuring that scaling cannot occur and that the solution will be maintained at a desirable uniform composition for consistent production etching.

Referring to FIG. 1, the reference numeral 1 generally designates the work or treating receptacle, such as a chemical mill or chemical sizing tank, suitably adapted to support a metal therein, such as aluminum (not shown), for treatment such as etching thereof. The work or treating receptacle 1 is filled with a metal treating solution 10 preferably by being pumped into the work or treating receptacle 1 from the bottom. The work or treating receptacle 1 has the inner sidewalls 6 and a bottom wall 11 to thereby define a tank. The surge space 2 is illustrated as a receptacle 12 positioned to receive an overflow from the treating receptacle 1 and the surge receptacle 12 as illustrated as having the outer shell or sidewalls 7 spaced outwardly from the inner shell or sidewalls 6 of the work or treating receptacle 1 to provide the space 8 therebetween for overflow of the metal-treating solution 10 from the treating receptacle 1. The surge receptacle 12 has a bottom wall 13 positioned below the bottom wall 11 of the treating receptacle 1 to collect the overflow metal treating solution therein.

The pipe or conduit 14 communicates the surge receptacle 12 with an inlet of a suitable recirculating pump 15. A pipe or conduit 16 communicates an output of the recirculating pump 15 with the bottom wall 11 of the treating receptacle 1 to provide substantially continuous recirculation of the metal-treating solution 10 to provide uniform treatment of the metal therein.

It is desirable to recirculate the metal-treating solution 10 until the quantity of metal salts dissolved from the metal being treated increases to a selected density value thereby reducing the effectiveness of the metal treating solution.

Density measuring apparatus 17 is mounted in a pipe or conduit 18 having one end connected to the recirculation pipe or conduit 16 for flowing the selected solution into the mixing receptacle 3. Therefore, when the density of the metal treating solution 10 exceeds a selected quantity, a portion of the collected solution is automatically flowed or pumped into the mixing receptacle 3.

A precipitating agent in the nature of an alkaline earth hydroxide is introduced into an upper portion of the mixing receptacle 3 and mixed with the collected solution therein for settling out solids formed in the mixture and forming a supernatant solution which is returned to the treating receptacle 1 through a pipe or conduit 19 which is connected to the recirculation pipe or conduit 16.

The precipitating agent is formed by mixing a dry alkaline earth material of the class of calcium oxide and barium oxide with deionized water in a supply receptacle 20. A hopper 21 contains said dry material which is added to the deionized makeup water within the supply receptacle 20. A mixer 22 mixes said dry material and the deionized water to form a solution of the precipitating agent which overflows into a trough 23 and a pipe or conduit 24 provides for flowing the mixed precipitating agent into the upper portion of the mixing receptacle 3.

A power driven mixer 25 is positioned in the mixing receptacle 3 for mixing the precipitating agent and the collected solution within the mixing receptacle 3. Mixing the precipitating agent with the collected solution chemically causes the metal salts therein to precipitate out of the collected solution as sulfates, chromates, aluminates, carbonates and the like, as determined by the selection of the alkaline earth hydroxide precipitating agent. Precipitation of the metal salts out of the collected forms a supernatant liquor which overflows into a trough 26 which collects the supernatant liquor for return to the treating receptacle 1 through the conduit 19.

The clarifier structure 4 is illustrated as being positioned in a lower portion of the mixing receptacle 3 for collecting the precipitated solids formed by mixing the solution and precipitating agents. The collected solids and some liquid flows from the bottom portion of the mixing receptacle 3 to a suitable filter for removing the solids such as the rotary vacuum filter 5, through a pipe or conduit 27 as controlled by suitable control apparatus 28. In the illustrated flow diagram, the pipe 27 discharges into a tank or receptacle 29 having the rotary vacuum filter 5 therein.

Separation of the solids from the liquid or solution is accomplished by conveying same from the rotary vacuum filter 5 to a separator 30 wherein the solids are conveyed therefrom by a vacuum pump 31 and the substantially solids-free filtrate flows into a seal tank or receptacle 32 positioned below the separator 30. A filtrate pump 33 removes the filtrate from the seal tank or receptacle 32 and flows same through a pipe or conduit 34 which is connected to the pipe 16 through the pipe 18 for returning the filtrate to the treating receptacle 1 at the bottom wall 11 thereof.

It is to be understood that while I have illustrated and described one form of my invention, it is not to be limited to the specific form or arrangement of parts herein described and shown.

I claim:

1. A process for regeneration of spent metal treating solutions comprising:
    a. collecting a portion of a metal-treating solution, said solution portion containing metal salts dissolved from the metal being treated in a treating receptacle;
    b. introducing a precipitating agent into said collected solution portion;
    c. mixing the precipitating agent and collected solution portion;
    d. settling out solids formed in the mixture to provide a supernatant solution;
    e. returning the supernatant solution to the treating receptacle;
    f. said metal salts in the metal-treating solution are at least one of the class of carbonates and sulfates and chromates and aluminates;
    g. said precipitating agent is selected from the class of calcium hydroxide and barium hydroxide and strontium hydroxide.

2. The process for regeneration of metal-treating solutions as set forth in claim 1 including:
    a. a first step wherein the precipitating agent is calcium hydroxide to precipitate carbonates and aluminates and gross amounts of sulfates; and
    b. a second step wherein the precipitating agent is barium hydroxide to precipitate additional sulfates and chromates.

3. The process for regeneration of metal treating solutions as set forth in claim 1 including:
    a. forming said precipitating agent by mixing a material of the class of calcium oxide and barium oxide with deionized water.

4. The process for regeneration of metal treating solutions as set forth in claim 3 including:
    a. collecting the precipitated solids formed in the mixture of collected solution portion and precipitating agent;
    b. separating solids from the mixed solution by filtering same to form a substantially solid free filtrate; and
    c. flowing the filtrate to the treating receptacle.

5. The process for regeneration of metal-treating solutions as set forth in claim 4 including:
    a. recirculating the collected solution portion by returning same to the treating receptacle for substantially reducing stratification in said treating solution and improving the treating of the metal therein.

6. The process for regeneration of metal-treating solutions as set forth in claim 5 including:
    a. maintaining a concentration of the metal salts within the metal treating solution substantially at a constant selected level.

7. The process for regeneration of metal-treating solutions as set forth in claim 6 wherein:
    a. said settling out of the precipitated solids removes a quantity of the metal salts substantially equal to a quantity of the metal salts dissolved from the metal being treated to maintain the concentration of metal salts substantially at a constant selected level and to permit uninterrupted metal-treating operations.

8. The process for regeneration of metal-treating solutions as set forth in claim 7 including:
    a. continuously measuring the density of the collected solution portion;
    b. recirculating the collected solution portion when the density is below a selected value; and
    c. mixing the precipitating agent with the collected solution portion when the density is above the selected value.